(12) United States Patent
Cheng et al.

(10) Patent No.: US 6,812,441 B2
(45) Date of Patent: Nov. 2, 2004

(54) METHOD AND APPARATUS FOR THE PREPARATION OF TRANSPARENT ALUMINA CERAMICS BY MICROWAVE SINTERING

(75) Inventors: Jiping Cheng, State College, PA (US); Dinesh Agrawal, State College, PA (US); Rustum Roy, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 10/343,752

(22) PCT Filed: Aug. 1, 2001

(86) PCT No.: PCT/US01/24171

§ 371 (c)(1),
(2), (4) Date: Feb. 3, 2003

(87) PCT Pub. No.: WO03/011792

PCT Pub. Date: Feb. 13, 2003

(65) Prior Publication Data

US 2003/0209541 A1 Nov. 13, 2003

Related U.S. Application Data

(60) Provisional application No. 60/222,845, filed on Aug. 4, 2000.

(51) Int. Cl.⁷ .............................................. H05B 6/78

(52) U.S. Cl. ..................... 219/686; 219/702; 219/756

(58) Field of Search ................................ 219/678, 679, 219/680, 686, 712, 756, 758, 759, 762, 763; 250/432 R, 428; 423/626; 501/153, 702, 710; 264/432, 434

(56) References Cited

U.S. PATENT DOCUMENTS

| | | | |
|---|---|---|---|
| 3,026,210 A | | 3/1962 | Coble |
| 4,217,337 A | * | 8/1980 | Yamada et al. .............. 423/626 |
| 4,963,709 A | | 10/1990 | Kimrey, Jr. |
| 5,451,553 A | | 9/1995 | Scott et al. |
| 5,736,092 A | | 4/1998 | Apté et al. |
| 5,814,818 A | * | 9/1998 | Ohashi et al. ........... 250/432 R |
| 6,011,248 A | * | 1/2000 | Dennis ....................... 219/700 |

FOREIGN PATENT DOCUMENTS

JP     7-187760    7/1995

OTHER PUBLICATIONS

Cheng et al., Fabricating Transparent Ceramics by Microwave Sintering; Am. Ceramic Soc. Bull. vol. 79, No. 9, pp. 71–74 (2000).

* cited by examiner

*Primary Examiner*—Tu Ba Hoang
(74) *Attorney, Agent, or Firm*—Law Office of Tim Cook P.C.

(57) ABSTRACT

An apparatus (10) for the development of transparent alumina ceramics using microwave energy at the frequency between 0.915 and 2.45 GHz inclusive in hydrogen atmosphere at ambient pressure comprises an enclosed, insulated chamber (14) to retain a workpiece (12) for the application of microwave energy. The chamber comprises a $TE_{103}$ single mode or a multimode microwave cavity into which is mounted a quartz tube (18). An insulation material (20), transparent to microwave energy, is positioned within the quartz tube. A port (28) for the introduction of hydrogen penetrates the cavity so that the microwave sintering of the workpiece is performed in an ultra-pure hydrogen atmosphere. The workpiece is preferably mounted on a refractory ceramic such as alumina tube for the microwave sintering process. A method, preferably using the apparatus, develops transparent alumina ceramics and single crystal sapphire.

12 Claims, 5 Drawing Sheets

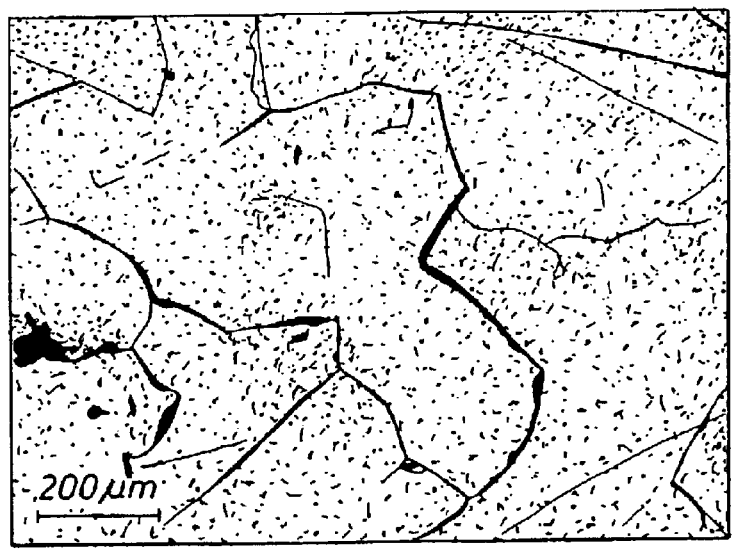
FIG. 3
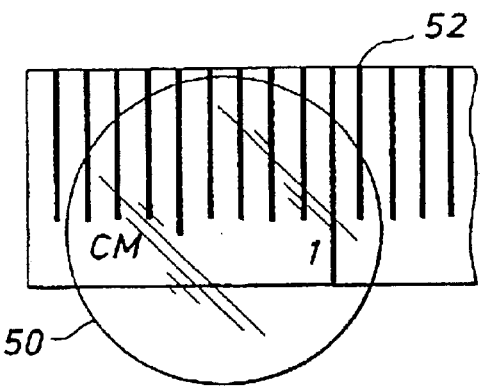
FIG. 5
FIG. 6
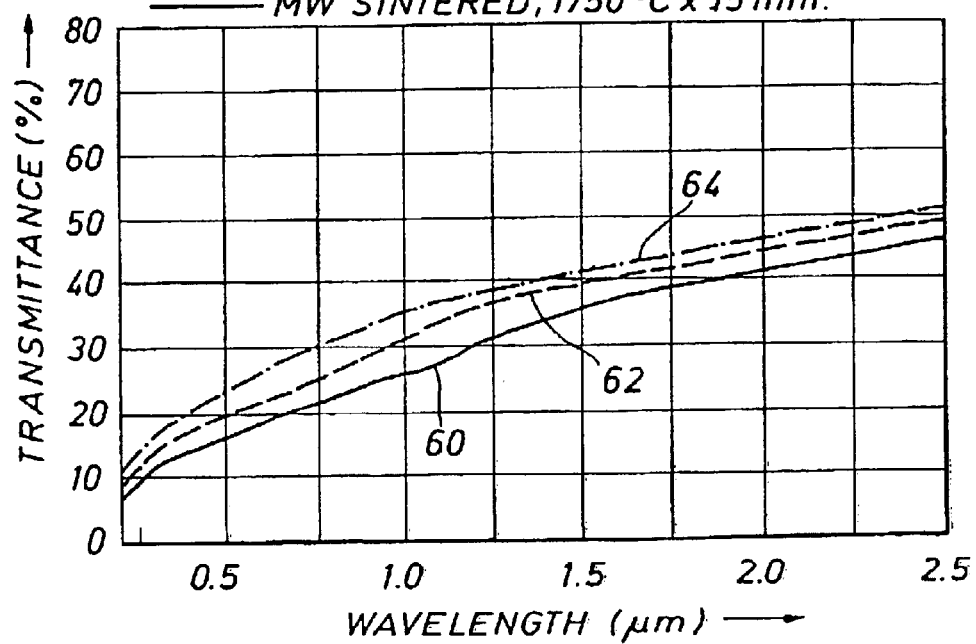

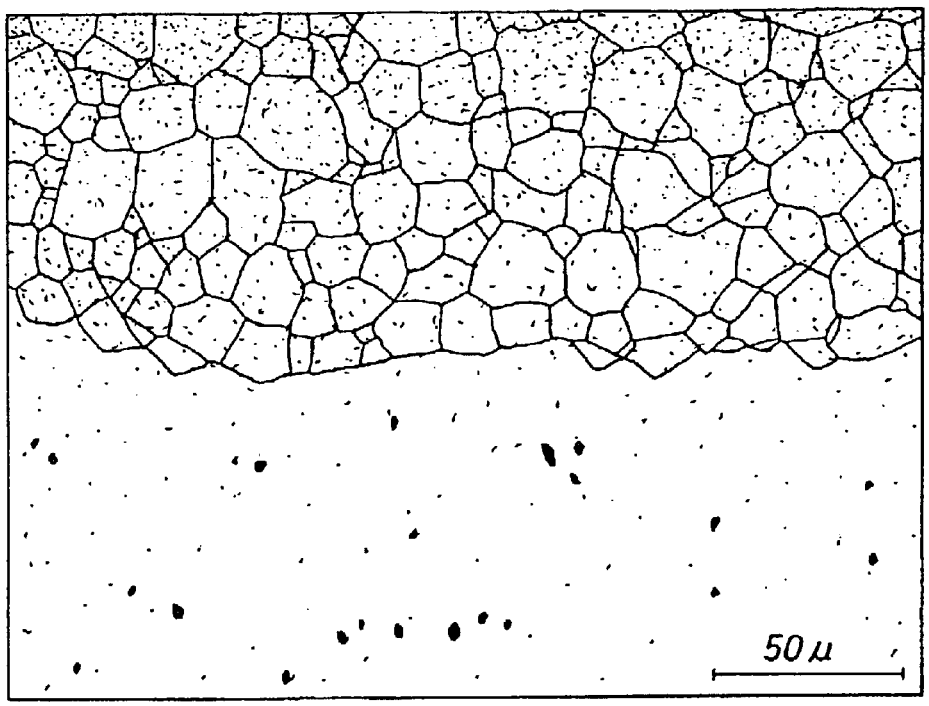
FIG. 8
FIG. 9
SOLID STATE THERMAL CONVERSION
OF POLYCRYSTALLINE ALUMINA TO
SAPPHIRE BY MICROWAVE HEATING
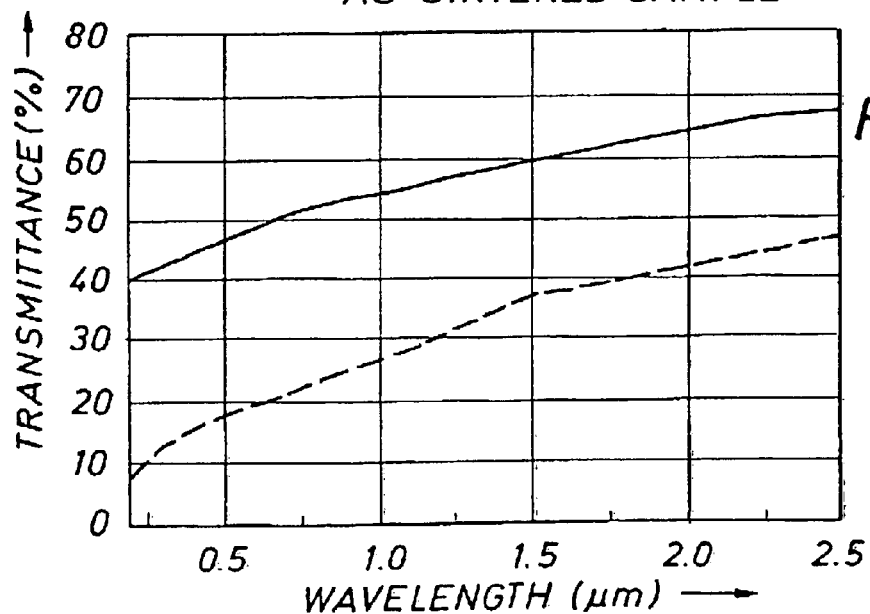
FIG. 10

METHOD AND APPARATUS FOR THE PREPARATION OF TRANSPARENT ALUMINA CERAMICS BY MICROWAVE SINTERING

This application claims the benefit of U.S. Provisional Application No. 60/222,845 filed Aug. 4, 2000, titled "Sintering of polycrystalline alumina to translucency using microwave sintering, for lighting applications and gems".

FIELD OF THE INVENTION

The present invention relates generally to the field of alumina ceramics and, more particularly, to a method and an apparatus for making transparent alumina ceramics using microwave sintering.

BACKGROUND OF THE INVENTION

Transparency is a valuable optical property in certain optical materials. In polycrystalline materials, a number of factors influence the degree of transparency of the material including grain size, density, crystal structure, porosity, and the grain boundary phase. Glasses are optically isotropic, monolithic (i.e. have no grain boundaries), and therefore possess excellent transparency. So can cubic ceramics. All non-cubic ceramics are anisotropic and polycrystalline. The grain boundaries in the ceramic strongly scatter light. However, if the grain size is smaller than the wavelength of the light (0.4–0.7 $\mu$m), then light can transmit through the ceramic. If the grain size is larger than the wavelength of light, by minimizing grain boundaries and impurity content, the material can be made transparent or translucent.

To achieve transparency in a ceramic, one must control grain growth, eliminate porosity, and achieve a fully dense material. Conventional methods of fabricating fully dense and reasonably transparent ceramics involve high temperatures, lengthy sintering times, and various complex processing steps, which not only make the processing of transparent ceramics uneconomical but often the desired properties are not achieved.

Transparent alumina ($Al_2O_3$) ceramics can be prepared either in single crystal (have generally termed, sapphire) or polycrystalline forms. Sapphire is used in many industrial and military applications, such as optical windows for lasers, spectrometers, armor parts, and IR-domes for infrared missile guidance systems. Also, synthetic sapphire gemstones have become a popular jewel material. Other common alumina ceramics include, for example, $MgAl_2O_4$ (spinel) and $(Na,Ca) Al_{12}O_{19}$ ($\beta$-alumina). Polycrystalline transparent alumina for optical applications was first made in the early 1960s as described in U.S. Pat. No. 3,026,210, issued to Coble. In Coble, polycrystalline alumina bodies having the desired optical properties were made by preparing a mixture of high purity finely divided alumina powder with $\frac{1}{16}$ to about $\frac{1}{2}$ weight percent of finely divided magnesia (MgO). The method comprised compacting the mixture of finely divided alumina and magnesia, and firing the compact for predetermined periods of time at a temperature not lower than about 1700° C. in a vacuum or a hydrogen environment. The resultant polycrystalline transparent alumina has become a key element in high-pressure sodium vapor lamps and other optical instruments manufactured throughout the world. The cost to manufacture polycrystalline transparent alumina is much lower than that of sapphire and it is easier to produce in large size products.

As described in Coble, and in techniques which have become well known in the art, polycrystalline transparent alumina is made via powder processing using high purity and fine particle sized alumina powder with the addition of a small amount of MgO, and sintering to pore-free state. Sintering is essential in obtaining high transparency material. In the conventional sintering process, extremely high sintering temperatures (up to 1900° C.) and long soaking times (several hours) under high vacuum or pure hydrogen atmosphere are applied in the fabrication of transparent alumina products to achieve the highest density and minimum porosity.

Microwave sintering is a new technique for ceramic materials processing which differs fundamentally from current conventional processes just described. In microwave processing, samples positioned in a microwave field absorb microwave energy and convert it into heat directly providing volumetric heating. As a result, a microwave process provides several advantages, such as more rapid and uniform heating, shorter processing time, fine microstructure, enhanced energy efficiency, and improved materials properties and product performance. Enhanced densification behaviors are also provided when microwave processes are used due to a reduction in the activation energy for sintering, which leads to a lower sintering temperature and shorter sintering time compared to conventional sintering processes.

Microwave sintering of alumina material is known. The early work on microwave sintering of alumina ceramics was performed in 1975 and reported by W. H. Sutton. In that work, over 1360 kg of production shapes of alumina castables were successfully fired using microwave energy. J. Katz et al. reported the successful sintering of relatively large samples (about 1 kg) of high purity, undoped $Al_2O_3$ to about 93% theoretical density (T.D.) in a 2.45 GHz multimode cavity. M. Janney and H Kimrey found that the alumina sample could achieve a density up to 98% T.D. at 1100° C. when microwave sintered at 28 GHz, and they suggested that compared to conventional sintering processing, the sintering activation energy is much lower when microwave radiation is applied, which leads to higher densification rate at lower temperatures in a microwave field. One of the inventors of the present invention, J. Cheng, and his co-workers investigated the densification kinetics of alumina, and found that the diffusion coefficient during microwave sintering was three times higher than that in the conventional sintering at the same temperature. None of these efforts resulted in fully dense, and therefore optically transparent alumina articles.

In U.S. Pat. No. 5,451,553, Scott et al. describe a solid state process for the conversion of polycrystalline alumina to sapphire material. In the described process, a polycrystalline material containing less than 100 ppm by weight of magnesia was reheated to temperatures above 1100° C., but below the melting point of alumina, in a high purity hydrogen atmosphere for 300 hours, or at 1880° C. for 3–9 hours. While effective, the described process is too time consuming and expensive for the large scale production of sintered alumina with adequate transparency.

The first attempt to prepare transparent ceramic samples by microwave sintering processing was conducted by Y. Fang et al. in 1995–1996. Using specially synthesized precursor powder, transparent hydroxyapatite and translucent mullite samples were made using a microwave sintering technique.

In Japanese Laid-Open Patent Application No. 7-187760, laid open Jul. 25, 1995, a method for manufacturing artificial sintered gemstone is described. A synthetic-gemstone starting material powder, obtained by adding chromium oxide, titanium oxide, and/or other oxides to an alumina powder and a magnesia powder is molded, and the resulted molding is then sintered by being heated at 1300 to 1800° C. with microwaves at 2.45 to 200 GHz in a reduced atmospheric pressure (vacuum) of 100 to 0.01 Pa to produce a synthetic gemstone. While this reference provides no details of the apparatus, certain characteristics can be discerned from the method described. At the reduced pressure of the vacuum, the specified frequency range is called for in order to attain adequate heating, probably by creating a plasma. Further, the reference provides no pre-heating of the molded material, and neither describes nor suggests the use of a hydrogen atmosphere.

Thus, there remains a need for an efficient, cost effective method and a structure for microwave sintering of polycrystalline alumina ceramics to a transparent body. The present invention is directed to this need.

SUMMARY OF THE INVENTION

The present invention provides a method and an apparatus for the formation of transparent ceramic bodies from polycrystalline alumina ($Al_2O_3$). The apparatus comprises an enclosed, insulated chamber to retain a workpiece for the application of microwave energy. The chamber comprises a single or multimode microwave cavity into which is mounted a quartz tube. An insulation material, transparent to microwave energy, is positioned within the quartz tube. A port for the introduction of hydrogen penetrates the cavity so that the microwave sintering of the workpiece is performed in an ultra-pure hydrogen atmosphere. The workpiece is preferably mounted on a refractory tube such as alumina for the microwave sintering process.

The apparatus just described is used to carry out the microwave sintering method of the invention. A starting $Al_2O_3$ powder with magnesia of 0.05% by weight is used to form a workpiece of the desired size and shape, such as for example by molding. The sample or workpiece is preferably formed by uniaxial press at 300 MPa pressure and calcined at 1100° C. for two hours in a conventional furnace for debindering. The workpiece is then placed inside the microwave chamber previously described and sintered, for example, at 0.915 to 2.45 GHz in a single mode cavity or a multi-mode cavity at power levels of 1.5 kW to 6 kW. Ultrahigh purity hydrogen can be applied as a sintering atmosphere for sintering at ambient pressure. Typically, the heating rate is 150° C. per minute in the single mode cavity and 100° C. per minute in the multi-mode cavity. High density and translucency are obtained by microwave sintering at 1700° C. for only 10 minutes, but sintering up to 30 minutes provides a more highly transparent alumina product. This method may be used to produce an alumina ceramic of $Al_2O_3$ composition and a corundum crystal structure. Further, this method may be used to produce an alumina based ceramic which has the β-$Al_2O_3$ or magnetoplumbite crystal structure or $MgO.(1-3)Al_2O_3$ and the structure of spinel.

In a further aspect of the present invention, the transparent alumina product obtained from the process just described may then be subjected to another microwave sintering step in order to develop a single crystal product. The sane apparatus previously described is used for this further processing step. This further sintering step produces a corundum (or sapphire) product.

These and other features of the invention will be apparent to those of skill in the art from a review of the following detailed description along with the accompanying drawings.

BRIEF DESCRIPTION OF THE DRAWINGS

FIG. 3 is a microscopic view of a specimen produced by rapid microwave sintering without the use of magnesia as a sintering aid.

FIG. 5 is an overhead view of a specimen sintered in accordance with this invention illustrating the transparency of the specimen.

FIG. 6 is a plot of transmittance versus frequency for a microwave sintered sample at various soak times.

FIG. 8 is a photomicrograph illustrating the microstructure development of $Al_2O_3$ single crystal area resulting from post-sintering treatment by microwave.

FIG. 9 is an overhead view of $Al_2O_3$ specimen sintered in accordance with this invention illustrating the transparency of the specimen as a result of post-sintering treatment by microwave.

FIG. 10 is a plot of transmittance versus frequency for a microwave sintered $Al_2O_3$ sample, illustrating the improvement in transmittance following post-sintering treatment by microwave.

DETAILED DESCRIPTION OF A PREFERRED EMBODIMENT

Figure 1:
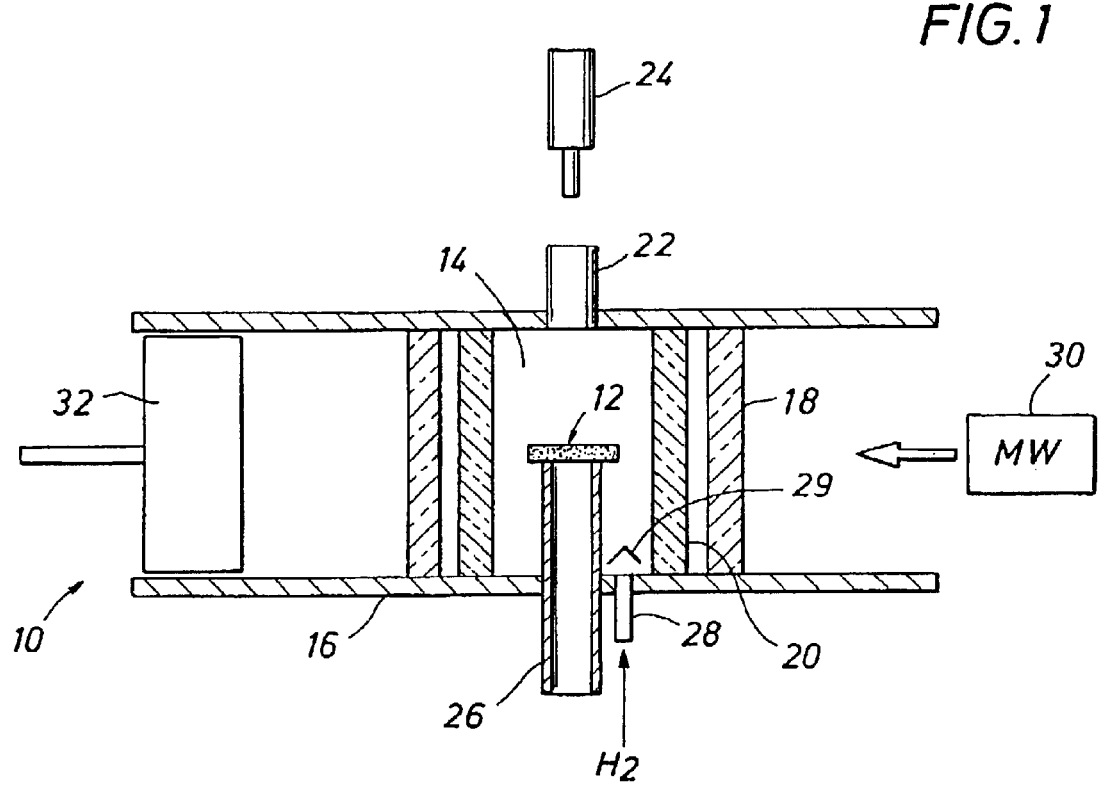
FIG. 1 is an elevation section view of the apparatus of the present invention.

FIG. 1 illustrates a microwave sintering system 10 constructed in accordance with the present invention. A compacted sample or workpiece 12 mounts within a chamber 14. The chamber 14 is formed by a $TE_{103}$ single mode cavity 16 with a quartz tube 18 securely mounted therein. Mounted within the chamber 14 is a tube of microwave transparent insulation 20, which effectively serves to maintain a more uniform heating of the sample or workpiece 12 during the sintering process to be described below.

A window port 22 attached to the chamber 14, preferably at the top of the chamber, to monitor the temperature of the workpiece is shown in FIG. 1. The pyrometer 24 is used to monitor and control the sintering temperature within the chamber 14 of the sample 12. A tube 26, preferably formed of $Al_2O_3$ to prevent contamination of the $Al_2O_3$ workpiece, penetrates into the chamber 14 to serve as a pedestal for the support of the workpiece 12. A port 28 also penetrates into the chamber 14 for the supply of hydrogen to the chamber. A diffuser 29 may also be provided to reduce the velocity of hydrogen flow around the sample 12 since such flow rate may cause a thermal gradient within the sample due to a cooling effect of the hydrogen. In operation, hydrogen purges the chamber to provide a pure hydrogen environment for the microwave sintering of the workpiece, and the hydrogen is maintained at atmospheric pressure.

A source 30, preferably a 1.5 kW microwave generator, provides microwave energy through the quartz tube 18 and the insulation 20 into the chamber 14 to sinter the workpiece 12. A shield and reflector 32 closes off the cavity 16 to eliminate microwave leakage from the system 10 and to reflect microwave energy back into the chamber 14 for peak efficiency of the system. In operation, the source 30 provides microwave energy, preferably at 0.915 to 2.45 GHz to effectively sinter the workpiece 12 in a hydrogen environment.

The workpiece is formed, for example, by the dry pressing uniaxially of a high purity (99.99%) commercial alumina powder, such as Baikalox CR10, Baikoski International, NC, USA. The properties of Baikalox alumina powders are listed in Table 1 and Table 2. As shown in Table 1, the primary particle size, measured in microns, is 0.15 and as shown in Table 2, the starting material has less than 150 parts per million impurities, and as used herein, the starting material is substantially pure.

TABLE 1

The properties of Baikalox alumina powder.

| Product code | CR10 |
| --- | --- |
| Specific Surface Area (BET-m$^2$/g) | 8 ± 1 |
| Major crystal phase | alpha |
| Major phase content (%) | 90 |
| Primary particle size (microns) | 0.15 |

TABLE 2

The chemical analysis of Baikalox alumina powder (maximum impurity/ppm by weight)

| Na | K | Si | Fe | Ca | Other cations |
| --- | --- | --- | --- | --- | --- |
| 20 | 50 | 40 | 10 | 5 | <5 |

To form the sample, the alumina powder is blended in acetone with 0.05% by weight of MgO (in form of Mg(NO$_3$)$_2$.5H$_2$O) and a binder using alumina mortar. Green samples are then prepared by dry pressing uniaxially into pellets, or in other desired shape, followed by cold isostatic press (CIP) at a pressure of 280 MPa, for example. The green densities of the compacts are preferably around 52–54%. The compacted pellets are pre-heated at 1100° C. for 2 hours using a conventional resistance furnace to burn out the binder. Rather than pellets, workpieces of a desired shape and configuration may also be formed, such as, for example, discs which may be used as optical components or tubes which may be used in high-pressure sodium vapor lamps or other optical instruments.

The pre-heated, compacted workpieces are then placed into the chamber 14. Microwave sintering is carried out using the source 30, a TE$_{103}$ single mode microwave applicator, coupled with a 1.5 kW microwave generator operating at 0.915 to 2.45 GHz for small samples (less than 0.5 inch diameter), or a multimode microwave applicator with a 6 kW microwave power source for large samples (up to one inch diameter). Ultrahigh purity hydrogen under 1 atmosphere pressure is introduced into the chamber through the port 28 providing the sintering atmosphere. Sintering is preferably performed in a temperature range of 1700 to 1900° C. with a soaking time of 10 to 60 minutes. Magnesia as a sintering aid has been found to be effective in the rage of 0.025 to 0.25% by weight, and preferably at 0.05% by weight.

Figure 2:
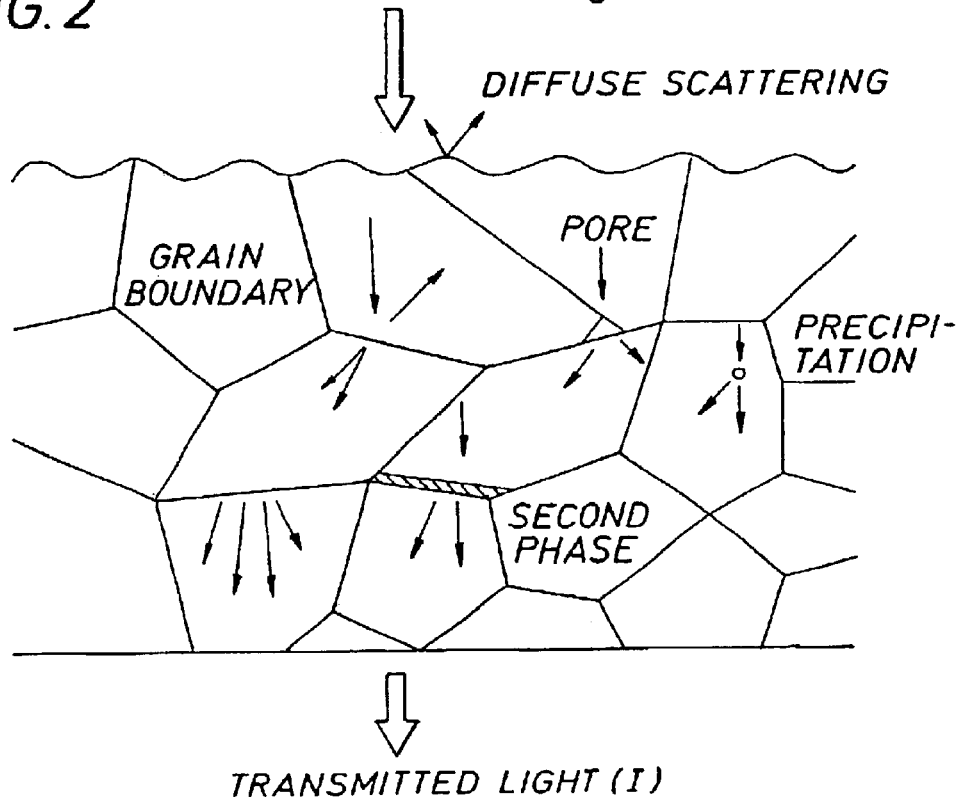
FIG. 2 is a section view of a sintered alumina ceramic body.

To digress briefly, FIG. 2 shows a section view of a sintered polycrystalline Al$_2$O$_3$ ceramic body, showing the effects of the various factors on the optical properties of the body. The transmissivity of the body is measured as a ratio of the transmitted light, I, over the incident light, I$_0$. Various factors affect this ratio. First, some of the incident light is scattered from the surface of the body by diffuse scattering. Further, grain size relative to the frequency of the incident light can affect the travel of light through the body. Other factors affecting the transmission of light through the body include grain boundaries, second phase layers (impurities), precipitation (foreign bodies), and pores (gas pockets between grain boundaries). The function of the sintering process of this invention is to reduce the effects of these factors on transmissivity.

Using MgO as a sintering aid is a key factor in making transparent Al$_2$O$_3$ ceramic samples. The mechanistic role of MgO in the sintering of Al$_2$O$_3$ has been studied for several decades. MgO plays two important roles. One role is to increase surface diffusion, which keeps the pores mobile enough to remain in contact with the grain boundary until the pores are annihilated by solid state diffusion. The other role is to decrease grain boundary mobility that reduces the pore boundary tendency to avoid pore entrapment within grains. However, the extra addition of MgO results in more second phase, MgAl$_2$O$_4$ spinel, formed at the boundary as shown in FIG. 2, which worsens the samples' transparency.

To demonstrate the importance of the MgO as a sintering aid, some pure Al$_2$O$_3$ samples with no addition of MgO were prepared using microwave sintering at a very high heating rate (550–600° C./min) to 1850° C. and dwelled at that temperature for 5 minutes under H$_2$ atmosphere. The demonstration was intended to investigate if a very high heating rate and short sintering time by microwave radiation could provide a fully dense and fine-grained Al$_2$O$_3$ body. The density of the sample was 3.83 g/cm$^3$, about 96.5% of theoretical density. It was found that the sintered body has enormous grain size (a few hundred microns), with lots of small pores trapped within the grains. A microscopic view of the result is shown in FIG. 3. The sample shown in FIG. 3 is only partially translucent with some visible cracks. This demonstration teaches that a sintering aid such as MgO is indispensable, and that extremely great grain growth rate can be obtained during microwave sintering.

Figure 4A:
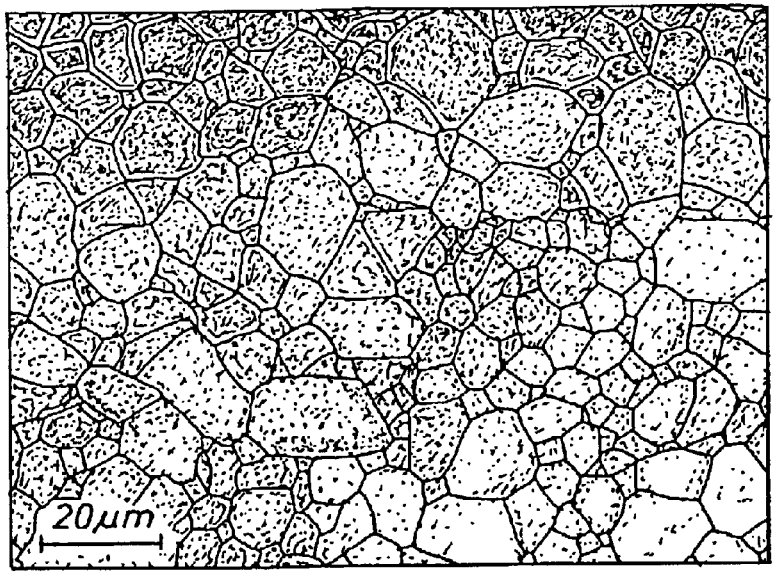
FIGS. 4a, 4b, and 4c depict microstructures of alumina using magnesia as a sintering aid for various lengths of time.
Figure 4B:
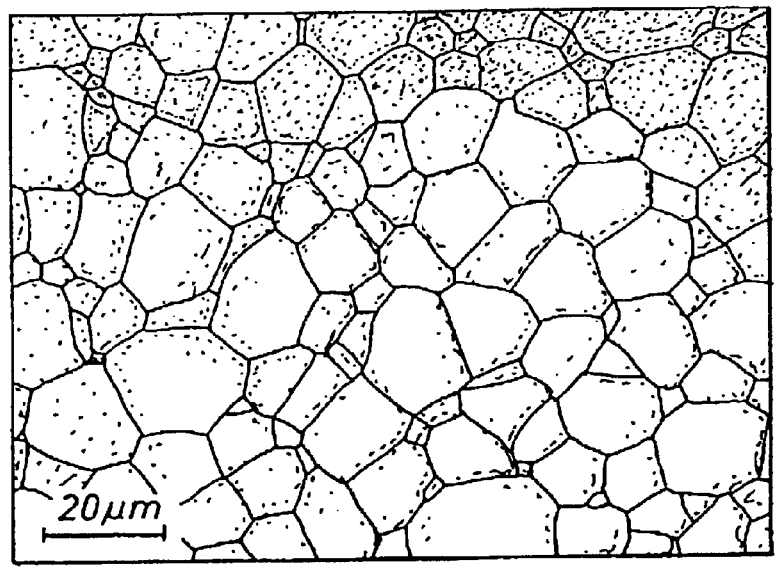
Figure 4C:
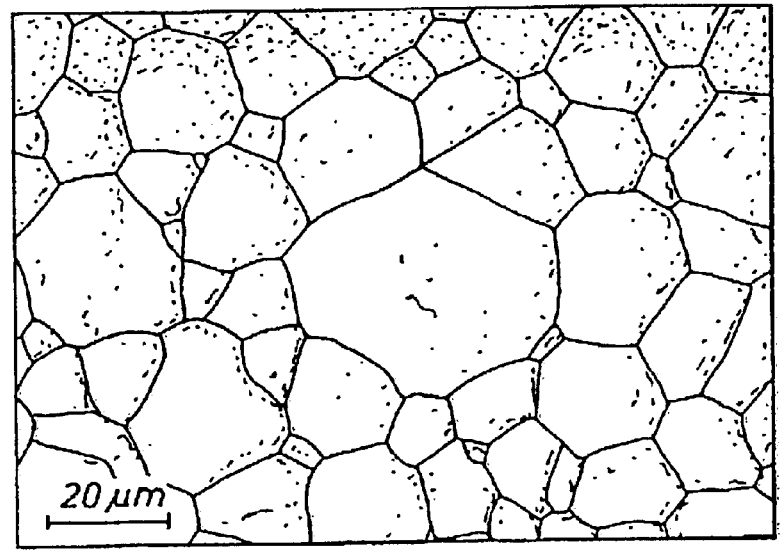

FIGS. 4a, 4b, and 4c illustrate the beneficial effects of using 0.05% MgO by weight (in the form of Mg(NO$_3$)$_2$.5H$_2$O) as sintering aid for Al$_2$O$_3$ samples. These figures show the microstructures of the samples microwave sintered at 1750° C. with dwelling times of 15 minutes, 30 minutes, and 45 minutes, respectively, at heating rate of 100° C./minute. As it is shown, these samples exhibited very neat grain boundary structure and uniform grain growth with no porosity. All samples had a density of 3.97 g/cm$^3$(~100% of theoretical density), but the average grain size increased from 20 microns to 40 microns while the sintering time increased incrementally from 15 minutes to 45 minutes. The appearance of the transparent Al$_2$O$_3$ sample that was microwave sintered at 1750° C. for 45 minutes is shown in FIG. 5. A specimen 50 is positioned over a measuring rule 52, in order to illustrate the transparency of the specimen.

The transmittance measurements of the microwave sintered Al$_2$O$_3$ samples are shown in FIG. 6. Plots 60, 62, and 64 depict transmittance in percent for the samples of FIGS. 4a, 4b, and 4c, respectively. Note that the transmittance is slightly higher for samples that are microwave sintered for longer periods of time. For comparison, the transmittance of single crystal Al$_2$O$_3$ (sapphire) is about 80% at all wavelengths within the frequency range of FIG. 6.

As previously shown and described with respect to FIG. 2, compared to single crystals, a sintered polycrystalline Al$_2$O$_3$ ceramic body possesses much more complicated microstructures that consist of grains, grain boundaries, second phases and pores, which greatly influence their optical properties. The transmissivity ($I/I_0$) is dependent not only on the crystal characteristics of the material, but on the grain size and boundary structure:

$$I/I_0 = (1-R)^2 \exp(-\mu x). \quad (1)$$

where I is the intensity of transmitted light exiting the sample body, $I_0$ is the intensity of incident light, R is the reflectivity, $\mu$ is the absorption coefficient, and x is the thickness of a sample body. The absorption coefficient $\mu$ can be given as $$\mu = \alpha + S_{im} + S_{op}. \quad (2)$$

where $\alpha$ is the absorption term characteristic of electron transition, $S_{im}$ is the scattering due to structural inhomogeneities such as pores and second phase, and $S_{op}$ is the scattering due to optical anisotropy. Since $Al_2O_3$ has a hexagonal rather than cubic crystal structure, and the light gets scattered at interfaces such as grain boundaries where refractive indices are discontinuous, and as a consequence, transmitted light becomes diffuse. In this case, $S_{op}$ is always an issue. To increase the transmissivity of a sintered polycrystalline $Al_2O_3$ body, it is most important to reduce $S_{im}$. That is, it is important to reduce porosity, reduce the grain boundary volume, and densify as much as possible by optimizing the sintering process. Finally, the best approach to improve the transparency is to remove boundaries to eliminate the $S_{im}$, and $S_{op}$ in equation (2), that means to convert the polycrystalline to single crystal structure.

Another feature of the present invention comprises a two step microwave sintering process. In that aspect of the invention, a workpiece of $Al_2O_3$ with 0.05% by weight MgO doping, is microwave sintered to transparency and then subjected to post-sintering treatment in a microwave field at elevated temperature, for example 1850–1880° C., under ultrahigh purity hydrogen atmosphere for a period of time sufficient to convert it into single crystal alumina. The same apparatus depicted in FIG. 1 is also used for this step. In a practical example, a 0.375 inch diameter $Al_2O_3$ (as-sintered transparent sample by microwave sintering at 1750° C. for 30 minutes) supported by the high purity $Al_2O_3$ tube 26 was placed in a single mode microwave cavity to apply microwave post-sintering treatment. It was observed that there were some temperature differences between the center and periphery area of the $Al_2O_3$ disk sample. For example, when the center area reached 1880° C., the temperature around the peripheral area was 1850° C. This may be due to hydrogen gas flowing by the workpiece, so to reduce this effect, the diffuser 29 may be used.

Figure 7A:
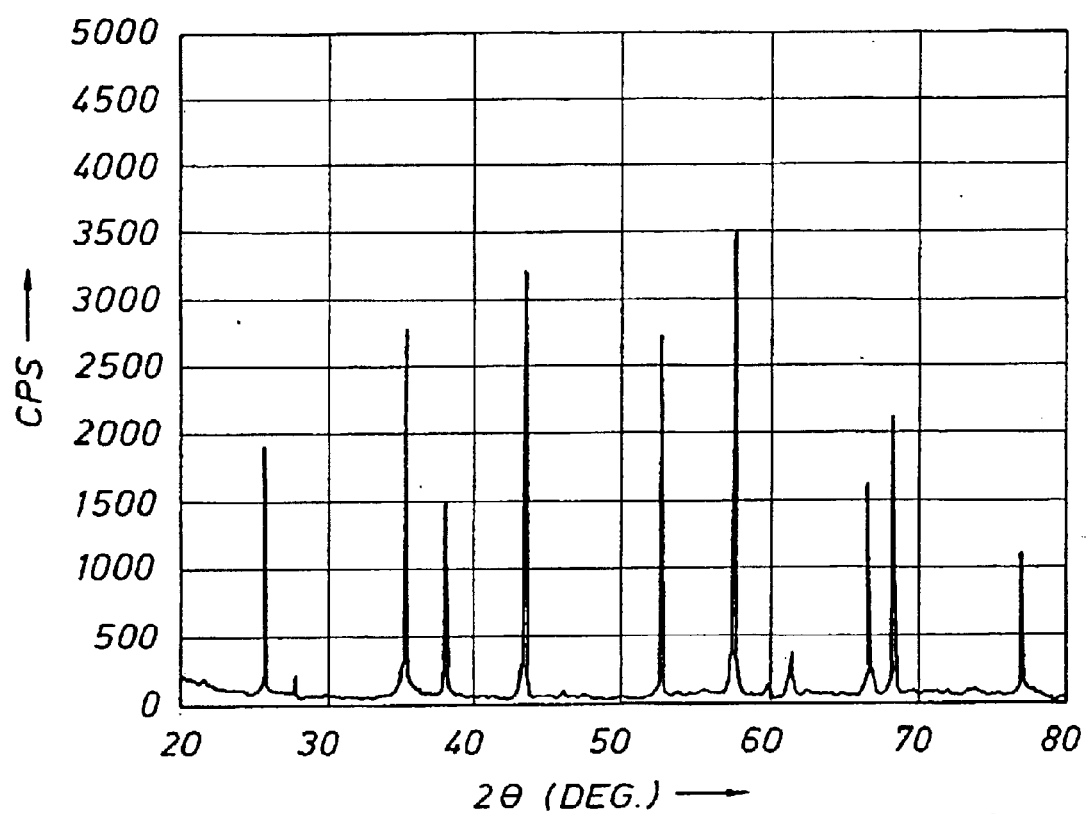
FIGS. 7a and 7b depict X-ray diffraction patterns for $Al_2O_3$ specimen treated with a single step microwave sintering (a), and the specimen with an additional heating step (post-sintering) to convert into single crystal alumina (b).
Figure 7B:
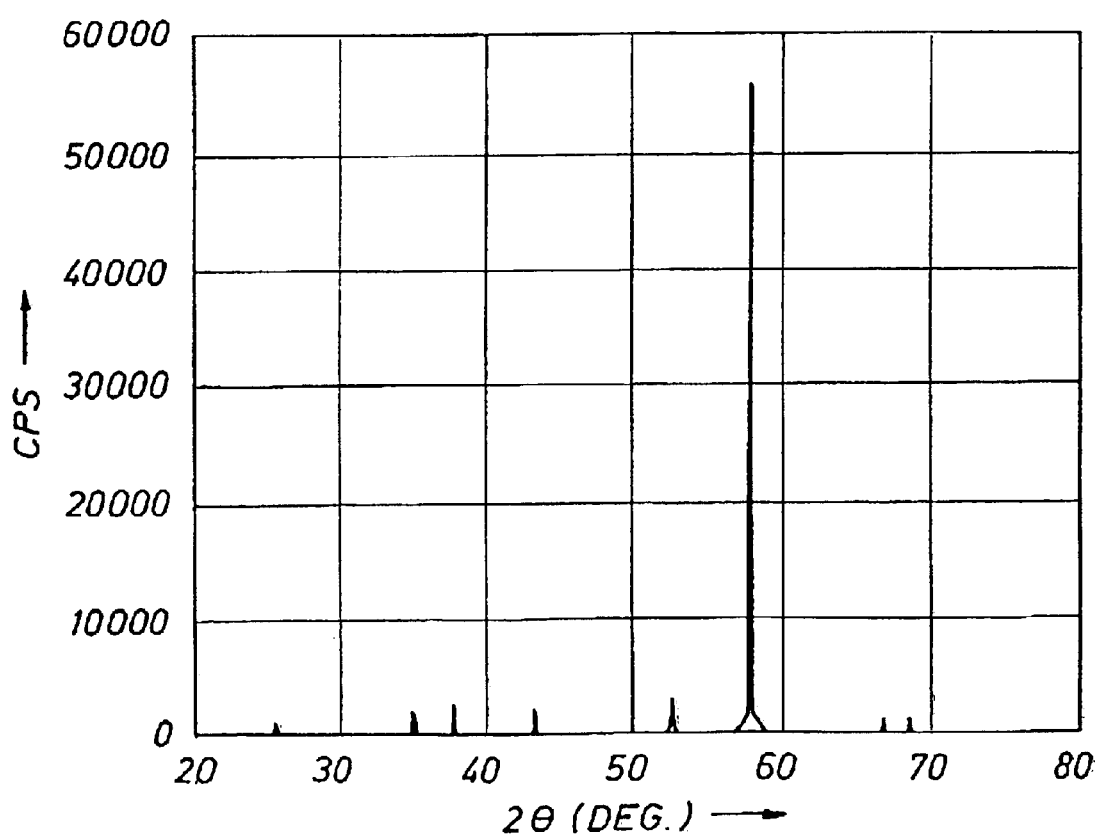

FIGS. 7a and 7b show the X-ray diffraction (XRD) patterns of the as-sintered $Al_2O_3$ sample (i.e. using a single step of microwave sintering) and the sample subjected to post-sintering step in microwave, respectively. The as-sintered sample's XRD pattern exactly tallied with the standard $Al_2O_3$ (corundum) powder XRD pattern (FIG. 7a). The same sample was microwave post-sintered at 1850° C. for 2 hours. Its x-ray pattern shows only {116} crystal plane as the dominant orientation, and there were still some small peaks corresponding to the polycrystalline phase (FIG. 7b).

FIG. 8 reveals the changes in the microstructures of the post-sintered $Al_2O_3$ sample that was microwave heated at 1880° C. (temperature in the center area of the disk sample) for 30 minutes. It is obviously demonstrated that the conversion of the polycrystalline phase to single crystal alumina during the microwave post-sintering processing has taken place. The microstructure showed that peripheral area of the sample remained in polycrystalline structure with average grain size of 30–40 microns (the top area in FIG. 8); the center part of the post-heated sample had no grain boundary and converted to a single crystal.

The microwave post-sintered sample is shown in FIG. 9, and its transmittance behavior is shown in FIG. 10. In comparison with FIG. 4, a 20% increase of the transmittance was achieved by microwave post-sintering step.

In the microwave field, the densification and grain growth of $Al_2O_3$ ceramic was enhanced in a great extent. The sample, microwave sintered at 1750° C. for only 15 minutes, showed fall densification and good transparency. The addition of small amount of MgO as sintering aid is indispensable to achieve pore-free structure. The microwave post-sintering step provides a much faster processing method for the solid-state conversion of polycrystalline $Al_2O_3$ sample into single crystal sapphire.

It is also possible to make colored transparent alumina by the addition of small amounts of transition element. Such transition elements in the form of dopants include $Cr_2O_3$, $V_2O_5$, NiO, CuO, and $TiO_2$, which may be added to the alumina-magnesia mixture to obtain various colored gems of polycrystalline alumina.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of sintering alumina based ceramics, comprising the steps of:
   a. forming a selected alumina ceramic powder into a workpiece;
   b. applying microwave energy to the formed workpiece in a hydrogen atmosphere at atmospheric pressure until the workpiece is transparent.

2. The method of the claim 1, wherein the alumina ceramic is of $Al_2O_3$ composition and has a corundum crystal structure.

3. The method of claim 1, wherein the alumina ceramic has the $Al_2O_3$ or magneto-plumbite crystal structure.

4. The method of claim 1, wherein the alumina-ceramic has the composition of MgO.(1–3) $Al_2O_3$ and structure of spinel.

5. The method of claim 1, wherein the microwave energy is applied at between about 0.915 GHz and about 2.45 GHz, inclusive.

6. The method of claim 1, wherein the composition and structure of the transparent workpiece are those of sapphire and further comprising the step of applying microwave energy a second time until the workpiece forms a single crystal.

7. The method of claim 6, wherein the second microwave energy is different than the first microwave energy.

8. The method of claim 6, wherein the second microwave energy is the same as the first the microwave energy.

9. A system for sintering an alumina ceramic workpiece comprising:
   a. a chamber adapted to retain an alumina ceramic workpiece;
   b. an insulation layer lining at least a portion of the chamber;

c. a temperature measuring instrument adapted to measure the temperature of a workpiece within the chamber;

d. a port into the chamber for the supply of hydrogen to the chamber; and e. a source of microwave energy adapted to subject the workpiece to microwave energy in a hydrogen atmosphere at atmospheric pressure until the workpiece is transparent.

10. The system of claim 9, further comprising a mount adapted to support the workpiece.

11. The system of claim 9, wherein the mount is made of refractory ceramic.

12. The system of claim 9, wherein the source of microwave energy provides microwave energy to the workpiece at 0.915 GHz to 2.45 GHz inclusive.

* * * * *